United States Patent [19]
Fry

[11] Patent Number: 5,758,481
[45] Date of Patent: Jun. 2, 1998

[54] MOTORIZED BALE HANDLER

[76] Inventor: Tom Fry, 09 351 RD 10, Montpelier, Ohio 43543

[21] Appl. No.: 589,783

[22] Filed: Jan. 22, 1996

[51] Int. Cl.$^6$ .......................... A01D 90/08; B65G 67/00
[52] U.S. Cl. ........................ 56/474; 56/473.5; 56/480; 414/24.5; 414/111
[58] Field of Search ........................ 56/474, 341, 343, 56/432, 475, 476, 480, 473.5; 414/24.5, 111, 132

[56] References Cited

U.S. PATENT DOCUMENTS

| | | | |
|---|---|---|---|
| 3,243,028 | 3/1966 | Tufts | 56/474 |
| 3,446,369 | 5/1969 | May et al. | |
| 3,446,370 | 5/1969 | Clendenin | |
| 3,499,552 | 3/1970 | May et al. | |
| 3,510,013 | 5/1970 | Best | |
| 3,534,878 | 10/1970 | Monroe | |
| 3,572,527 | 3/1971 | Butler | |
| 3,620,384 | 11/1971 | Welker | 214/6 B |
| 3,622,022 | 11/1971 | Grey | 214/83.36 |
| 3,677,428 | 7/1972 | Mallett | 214/147 G |
| 3,782,570 | 1/1974 | Sunderman | 214/519 |
| 3,857,498 | 12/1974 | Grey et al. | 214/8.5 A |
| 3,876,093 | 4/1975 | Carriere | 214/147 R |
| 3,902,608 | 9/1975 | Butler et al. | 214/6 B |
| 3,934,734 | 1/1976 | Grey et al. | 214/6 B |
| 4,050,022 | 9/1977 | Schurz | 214/518 |
| 4,150,756 | 4/1979 | Butler | 414/40 |
| 4,259,035 | 3/1981 | De Coene et al. | 414/38 |
| 4,268,202 | 5/1981 | Verdenne et al. | 414/39 |
| 4,273,488 | 6/1981 | Hill et al. | 414/44 |
| 4,278,379 | 7/1981 | Grey | 414/44 |
| 4,282,969 | 8/1981 | Zipser | 198/747 |
| 4,289,435 | 9/1981 | Boirin et al. | 414/39 |
| 4,304,103 | 12/1981 | Butler et al. | 414/24.5 |
| 4,305,690 | 12/1981 | Butler et al. | 414/44 |
| 4,329,102 | 5/1982 | Gray | 414/24.5 |
| 4,370,796 | 2/1983 | Wilson | 29/564.3 |
| 4,505,633 | 3/1985 | Butler | 414/528 |

(List continued on next page.)

Primary Examiner—Terry Lee Melius
Attorney, Agent, or Firm—Jerry Semer

[57] ABSTRACT

The invention is a simple and efficient system for picking up bales of hay, straw, or other agricultural material in the field and transporting these in stacks (four bales high) to a remote location. The first step in the process is attaching to the baler a cart with a turn table. The baler bales the hay, straw, or other agricultural material into a rectangular bale that is delivered lengthwise to the cart. The turn table on the cart rotates the bale ninety degrees and discharges the bale. Then a bale is picked up by a self propelled bale wagon that consists of: a cab with an engine, a flat bed, and the appropriate machinery for picking up the bale. A boom is mounted on the front of the bale wagon. The boom includes a plurality of tines designed to penetrate the bale as it rests in the field after coming off the turn table cart. These tines are then used to hold the bale while the boom, which is driven by a hydraulic system, rotates one hundred eighty degrees and places the bale on a conveyor table above the cab. The conveyor table propels the bale onto a pair of moveable forks. The moveable forks then lower the bale to the flat bed of the bale wagon. The bale wagon then moves forward and the tines stab another bale. This bale is again pivoted one hundred eighty degrees and placed on the conveyor table above the cab. The conveyor table propels the bale rearward and the bale is propelled off the conveyor table and on top of the first bale. Said second bale is held in place by the vertical moveable support tail gate. The stack, two bales high on the bed of the bale wagon, is then propelled rearwardly by a ram that pushes the bales and the vertical moveable support tail gate toward the back of the bed, leaving room for two more bales to be placed upon the wagon by the boom. The bale wagon moves forward and goes through the same process as described above to place two more bales on the wagon, and then the ram again moves these bales rearwardly to make room for two more. The bale wagon bed can carry up to eight bales in this fashion. The bales are then transported to the remote location. At the remote location the bed is hydraulically pivoted ninety degrees so that the bales form a stack four bales high and two bales wide. The bed has a pivotal ram that pivots and pushes the bales off the vertically moveable support tailgate. The bale wagon then returns to the field for more bales.

13 Claims, 16 Drawing Sheets

U.S. PATENT DOCUMENTS

| | | | |
|---|---|---|---|
| 4,534,691 | 8/1985 | Miguel | 414/38 |
| 4,630,986 | 12/1986 | Taylor | 414/24.6 |
| 4,710,087 | 12/1987 | Naaktgeboren et al. | 414/44 |
| 4,789,289 | 12/1988 | Wilson | 414/24.6 |
| 4,955,774 | 9/1990 | Van Eecke et al. | 414/111 |
| 5,129,775 | 7/1992 | Coats et al. | 414/24.5 |
| 5,150,999 | 9/1992 | Dugan | 414/24.5 |
| 5,288,193 | 2/1994 | Warburton et al. | 414/24.5 |
| 5,542,803 | 8/1996 | Deiggs | 414/24.5 X |
| 5,560,191 | 10/1996 | Finney et al. | 56/474 |

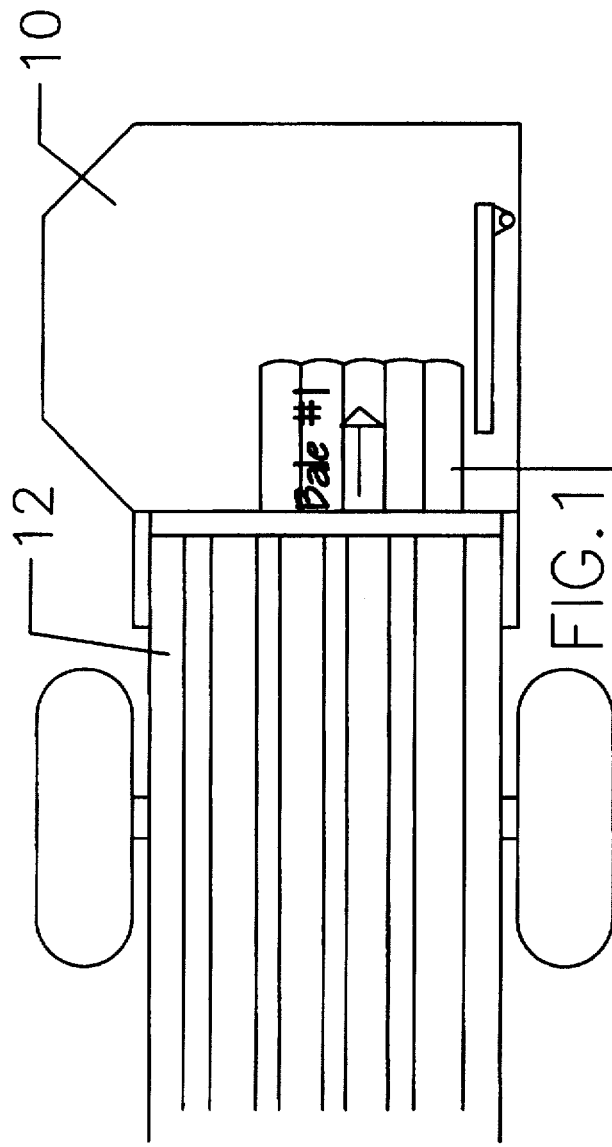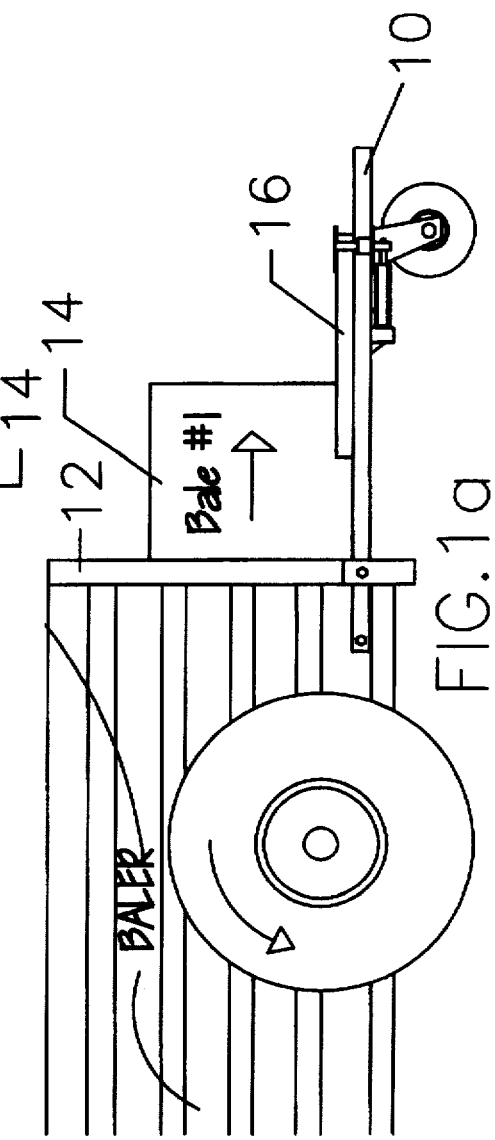

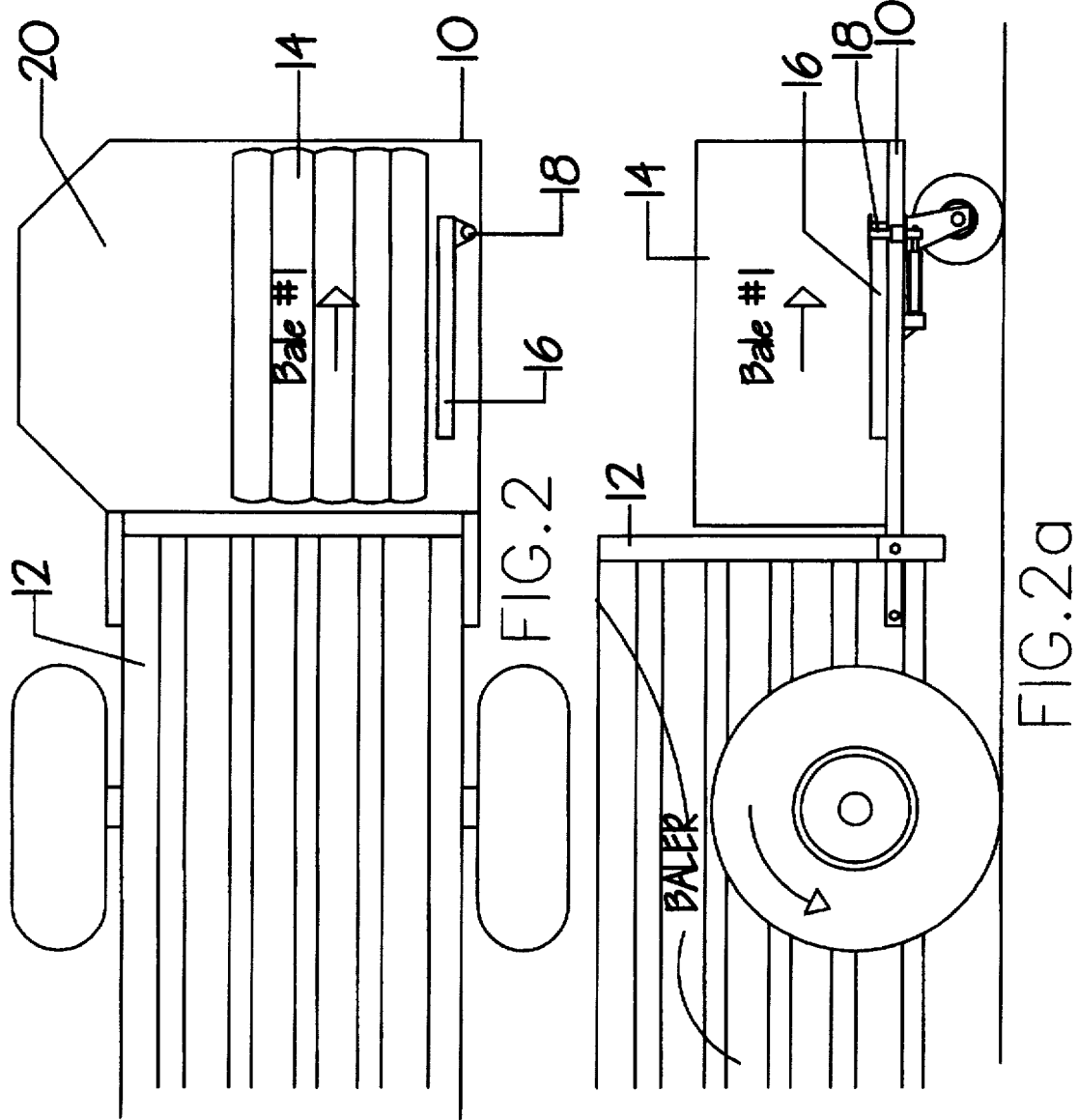

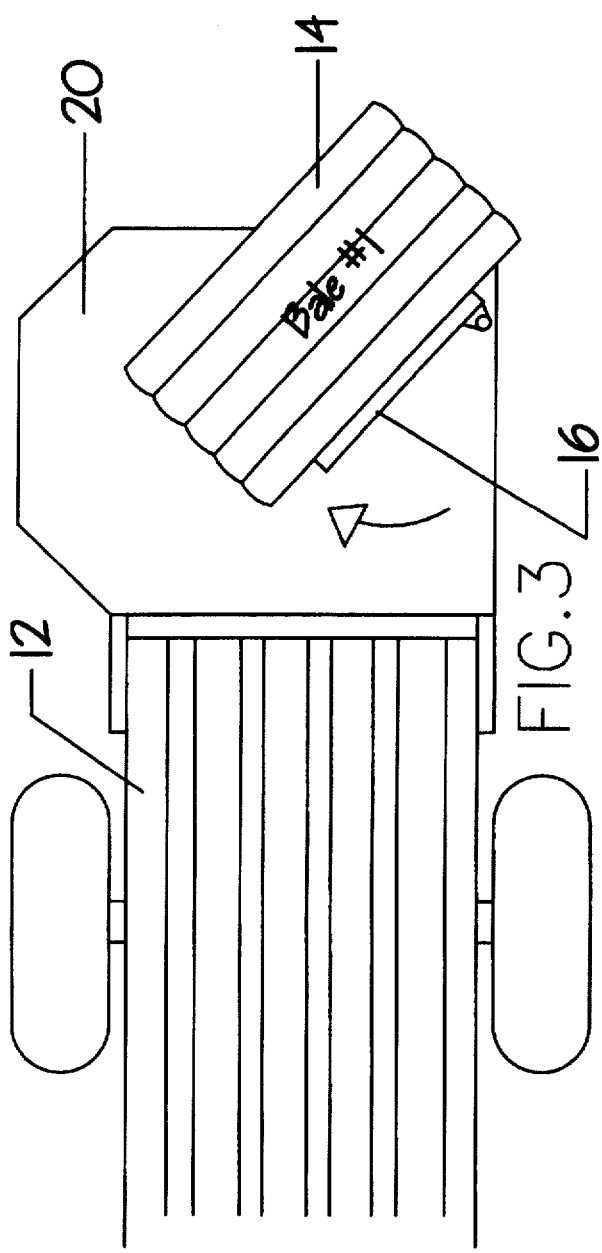
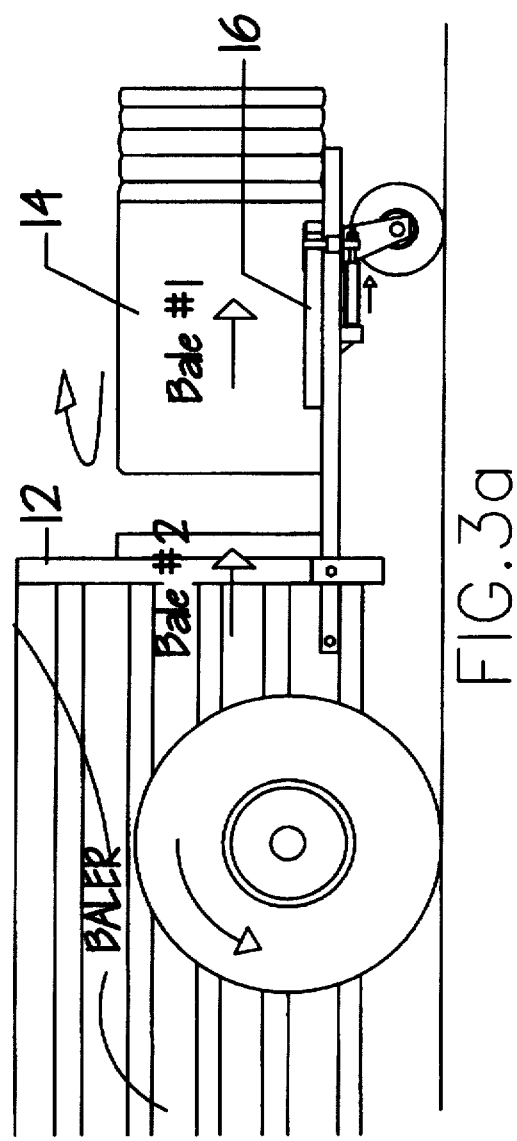
FIG. 3
FIG. 3a

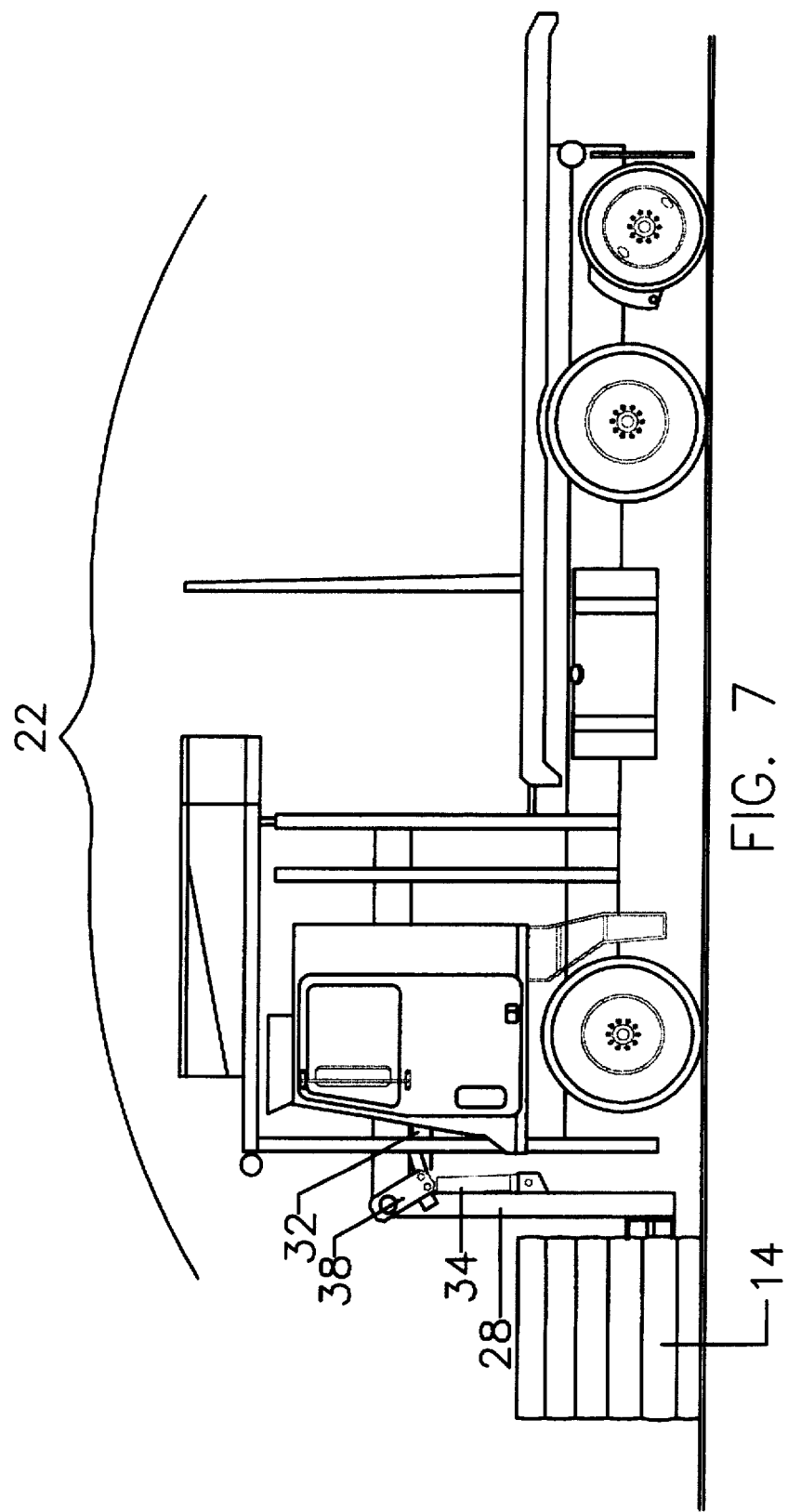

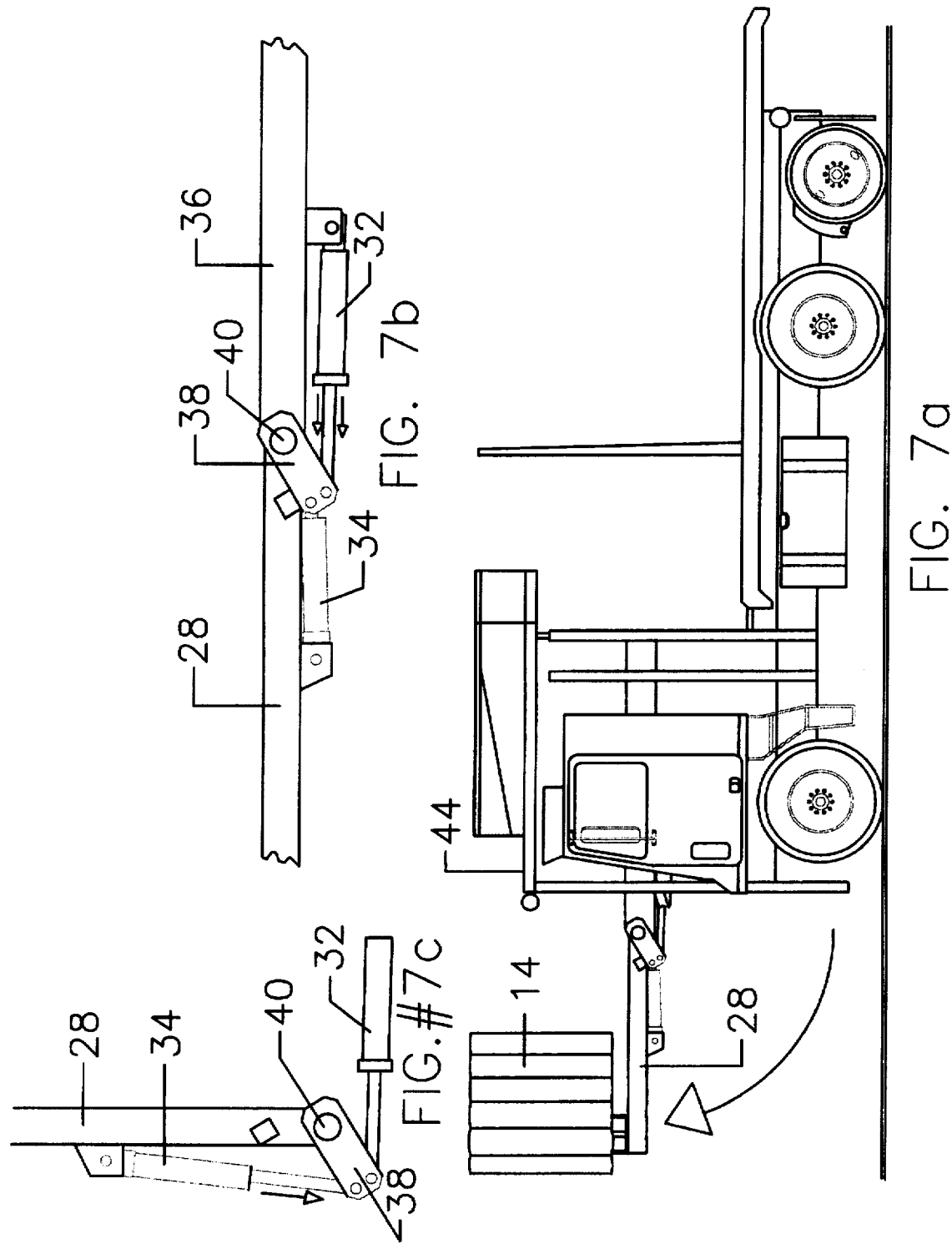

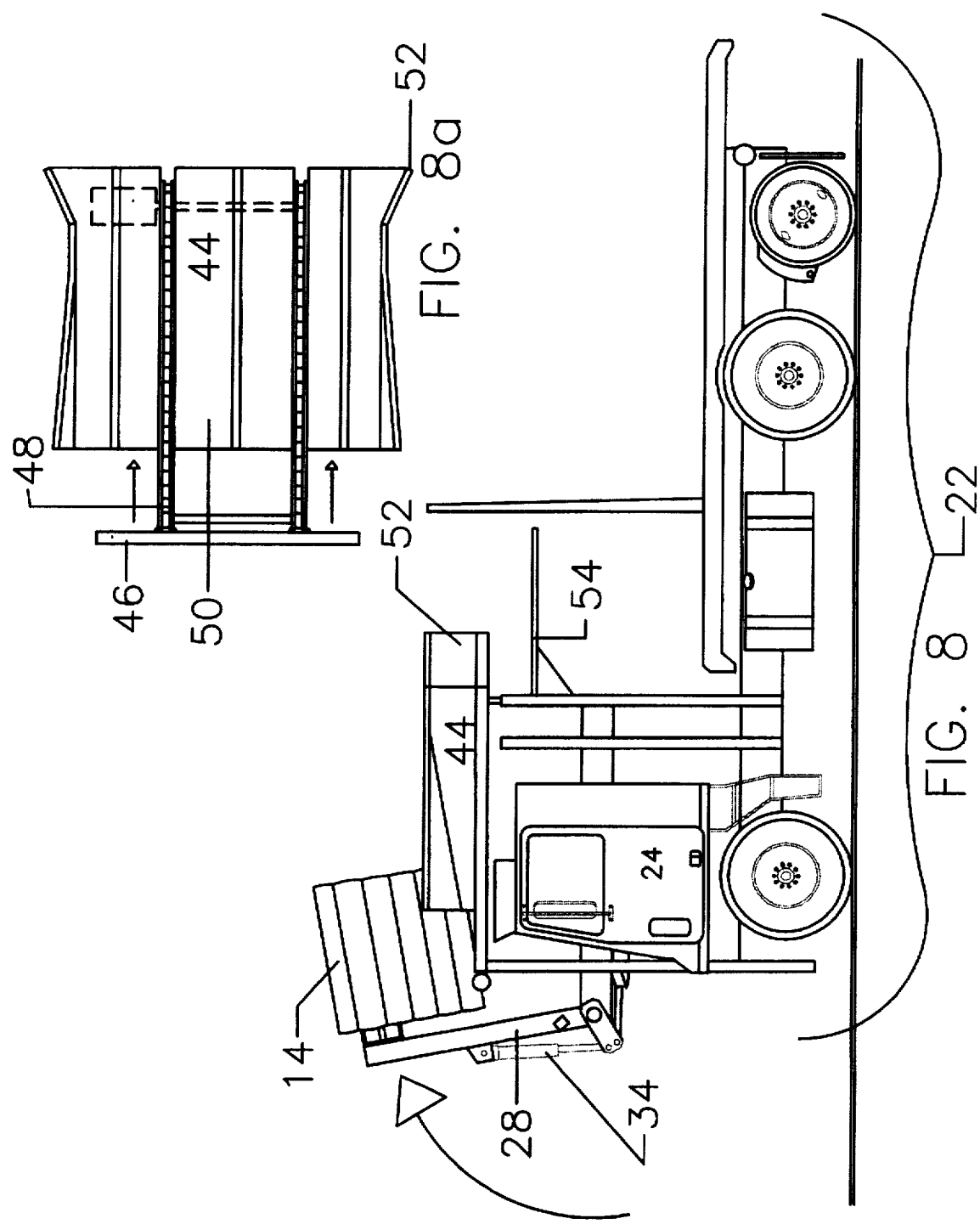

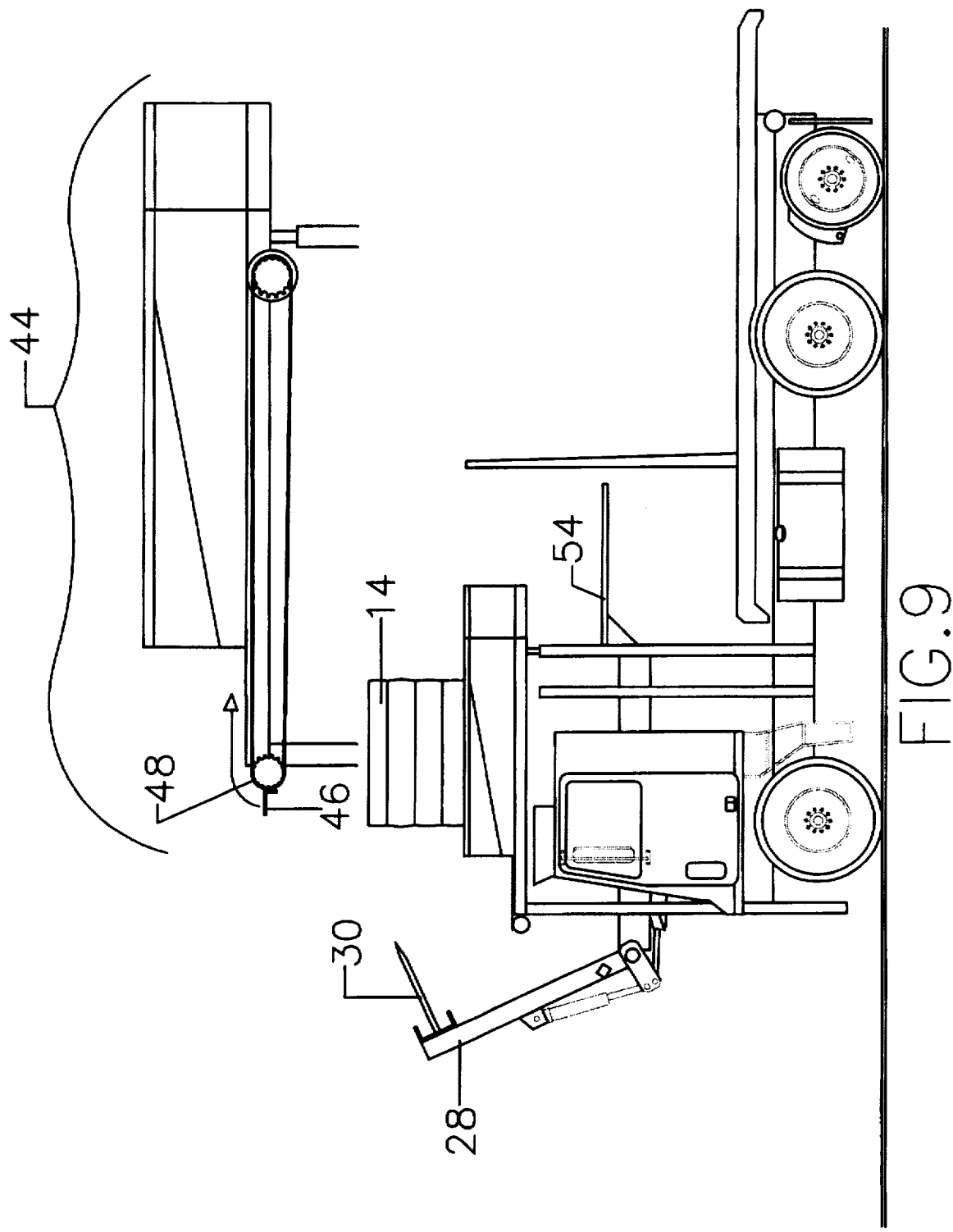

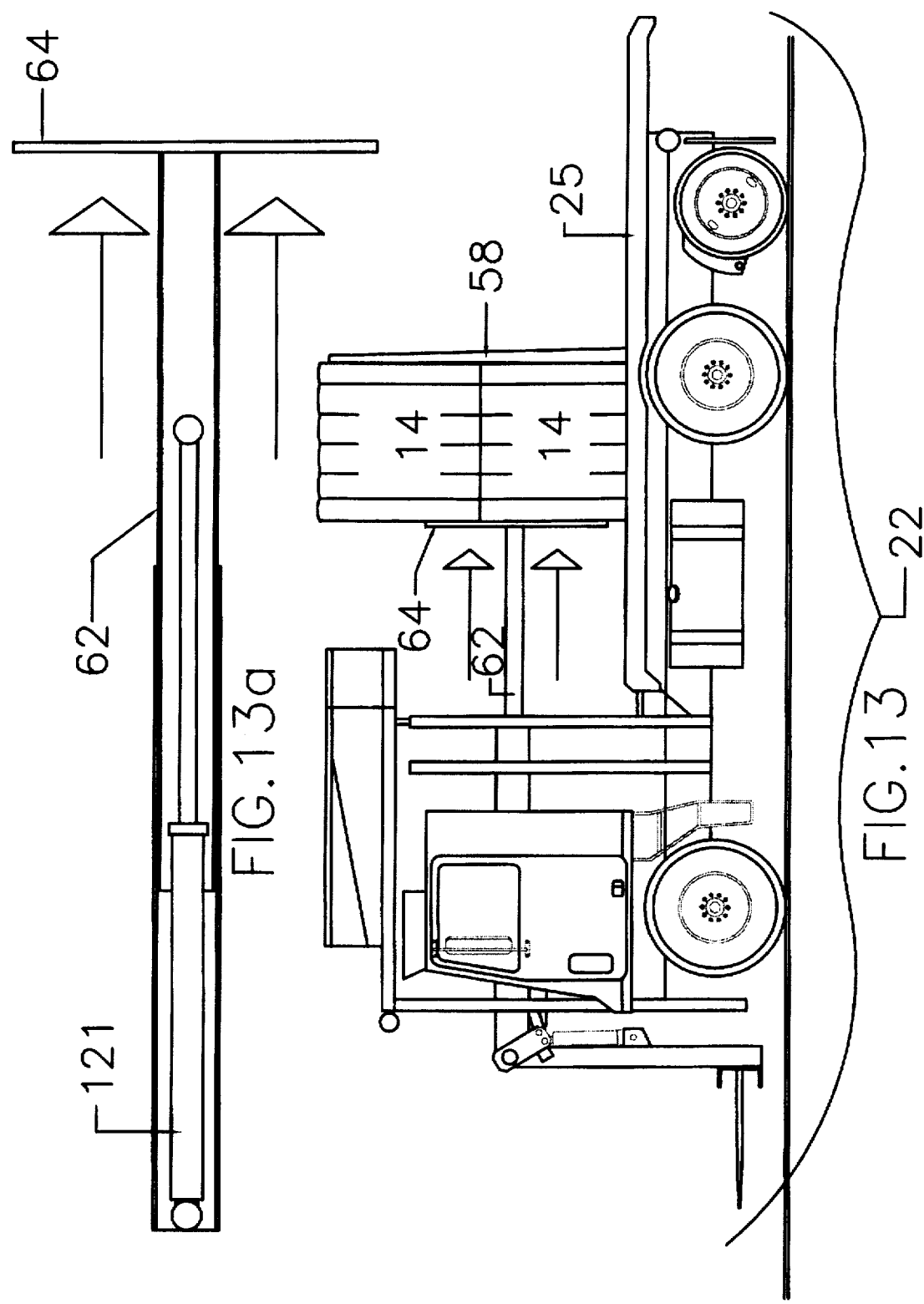

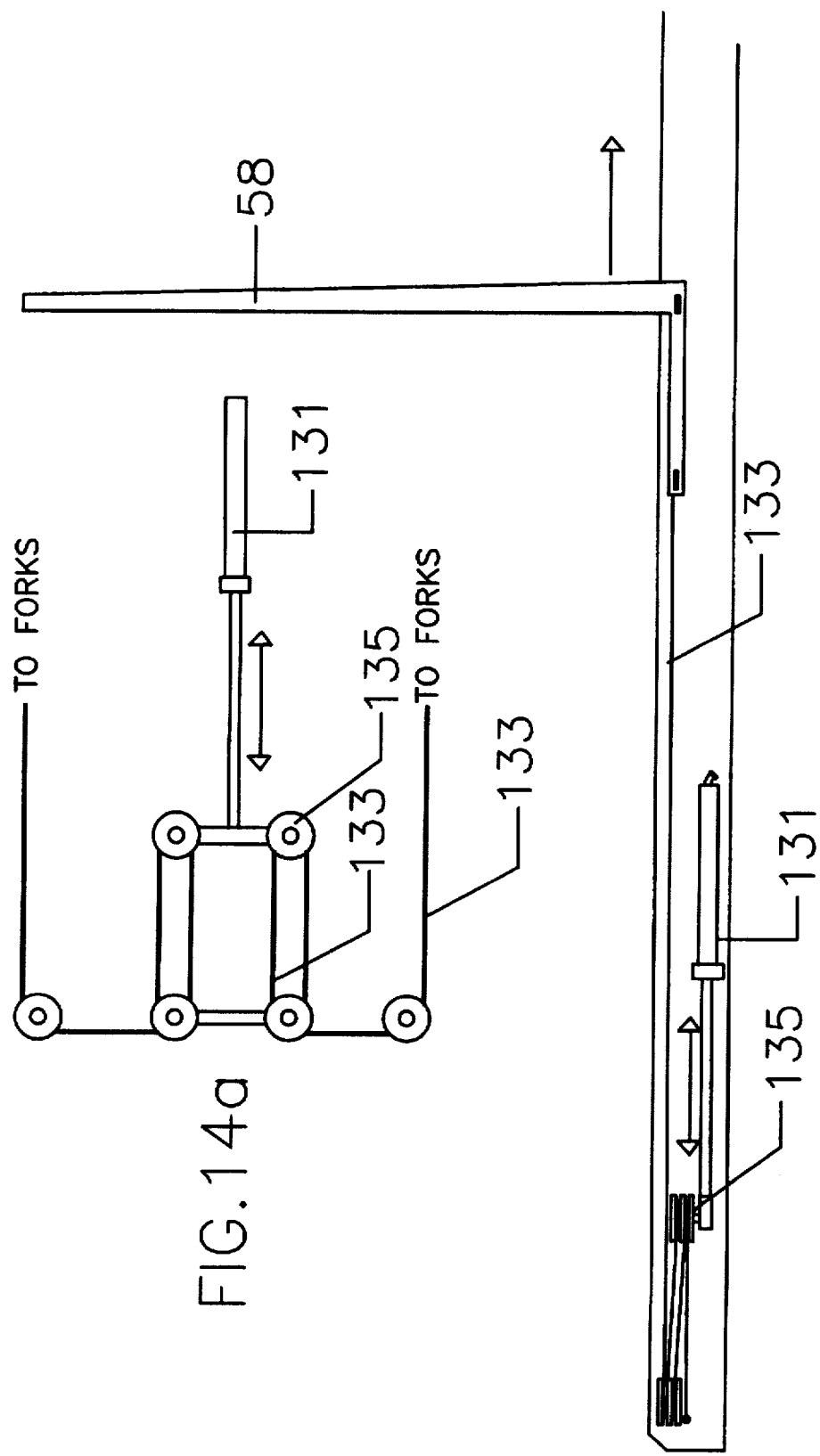

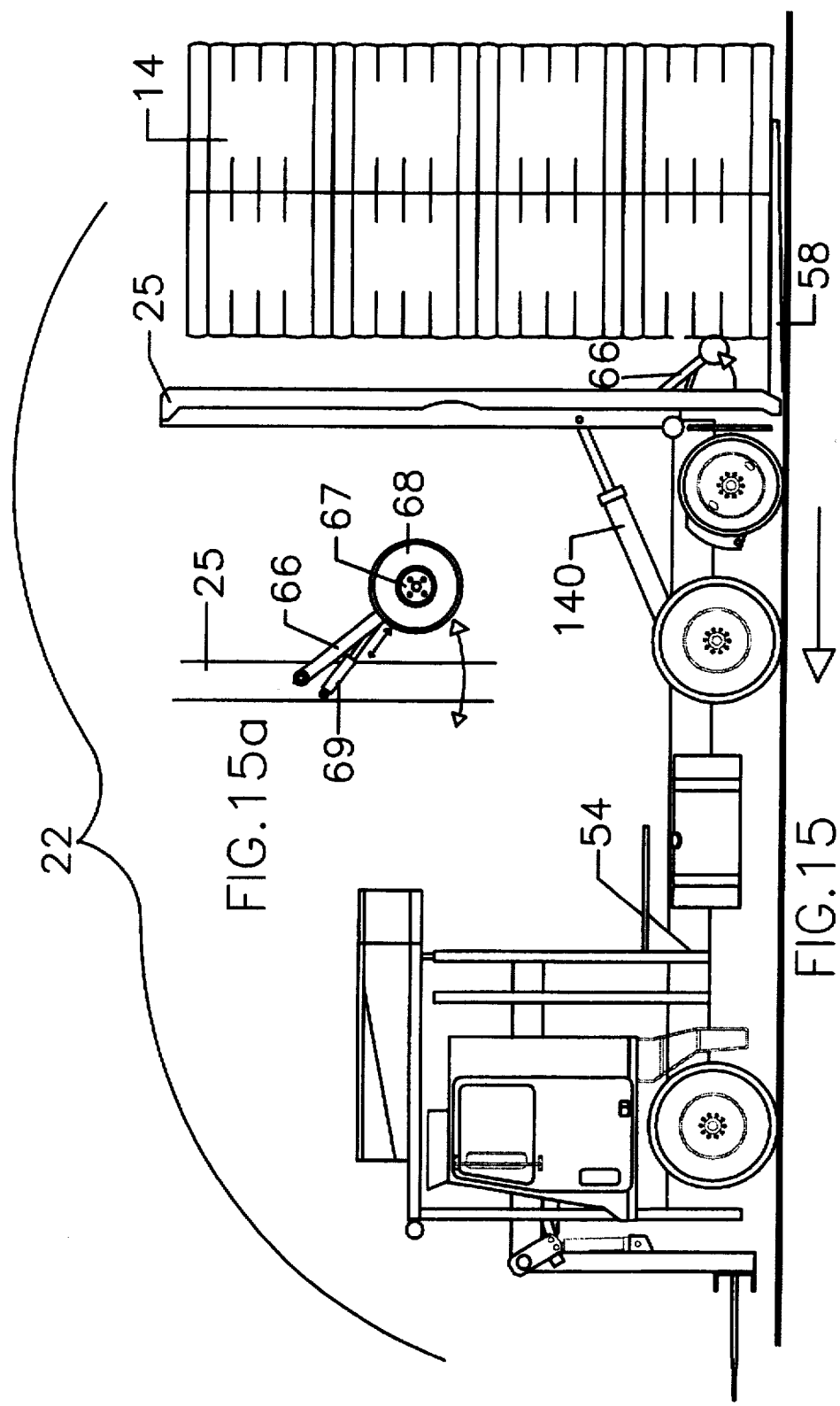

MOTORIZED BALE HANDLER

FIELD OF INVENTION

The present invention relates to a system for picking up bales of straw, hay, or other agricultural material in the field and transporting them to a remote location.

BACKGROUND OF THE INVENTION

The evolution of the hay and straw industry in recent years has created bales of larger size to be transported out of the fields. Due to the large size of these bales, there is a need for multifaceted equipment that can pick up the bales in the fields, accumulate a load of bales, and transport them to a remote storage area where the accumulation of bales can be stacked. Furthermore, this equipment must be able to stack the bales in rather large stacks so that the time and fuel needs of the equipment will be minimized.

Currently the system for handling these bales is basically a loader that places them on a truck with a flat bed or a trailer. One of the objectives of this invention is to produce a self propelled bale wagon that can pick up a large number of bales in the field, deliver them to a remote location, and stack them in large piles

SUMMARY OF THE INVENTION

The invention is a simple and efficient system retrieving bales of hay, straw, or other agricultural material in the field, transporting them to a remote location and stacking them four bales high. The first step in the process is attaching to the baler a cart with a turn table. The baler bales the hay, straw, or other agricultural material into rectangular bales that are delivered lengthwise to the cart. The turn table on the cart rotates the bale ninety degrees and discharges the bale. Then the bales are picked up by a self-propelled bale wagon that consists of: a cab with an engine, a flat bed, and the appropriate machinery for picking up the bale. A boom is mounted on the front of the bale wagon. The boom includes a plurality of tines designed to penetrate the bale as it rests in the field after coming off the turn table cart. These tines are then used to hold the bale while the boom, which is driven by a hydraulic system, rotates one hundred eighty degrees and places the bale on a conveyor table above the cab. The conveyor table propels the bale onto a pair of moveable forks. The moveable forks then lower the bale to the flat bed of the bale wagon.

The bale wagon then moves forward and the tines stab another bale. This bale is again pivoted one hundred eighty degrees and placed on the conveyor table above the cab. The conveyor table propels the bale rearward and the bale is propelled off the conveyor table and on top of the first bale. Said second bale is held in place by the vertical, moveable support tailgate. The stack, two bales high, on the bed of the bale wagon is then propelled rearwardly by a ram that pushes the bales (and the vertical, moveable support tailgate) toward the back of the bed, leaving room for two more bales to be placed upon the wagon by the boom. The bale wagon moves forward and goes through the same process as described above to place two more bales on the wagon, and then the ram again moves these bales rearwardly to make room for two more. The bale wagon bed can carry up to eight bales in this fashion.

The bales are then transported to the remote location. At the remote location the bed is hydraulically pivoted ninety degrees so that the bales form a stack of four bales high and two bales wide. The bed has a pivotal ram that pivots and pushes the bales off the vertically moveable support tailgate. The bale wagon then returns to the field for more bales.

BRIEF DESCRIPTION OF THE DRAWINGS

FIG. 1 shows the first step in the process of the invention and is a top view of the baler and the cart of the invention attached together.

FIG. 1A shows the side view of step one of the process of the invention showing the baler and the cart attached together.

FIG. 2 is a top view of the baler and the cart of the invention at step 2 in the invention process.

FIG. 2A is a side view of the baler and the cart of the invention at step 2 in the invention process.

FIG. 3 is the top view of the baler and the cart of the invention at step 3 in the invention process.

FIG. 3A is the side view of the baler and the cart of the invention at step 3 in the invention process.

FIG. 7 shows a side view of the truck of the invention at step 6 in the invention process.

FIG. 7A shows a side view of the truck of the invention at step 7 in the invention process.

FIG. 7B is a side view of the hydraulic system of the boom of the invention at step 7 of the invention process.

FIG. 7C is a side view of the hydraulic system of the boom as in step 8 of the invention process.

FIG. 8 is a side view of the truck at step 8 in the invention process.

FIG. 8A is a top view of the conveyor table of the invention.

FIG. 9 is a side view of the conveyor table that shows the chains and the bar.

FIG. 11A is the side view of the moveable forks showing the hydraulic system that lifts and lowers the moveable forks.

FIG. 13 is a side view of the truck of the invention in step 12 of the invention process.

FIG. 13A is a view of the horizontal ram.

FIG. 14 is a side view of the hydraulic system that moves the tailgate.

FIG. 14A is a top view of the hydraulic system that moves the tailgate.

FIG. 15 is the side view of the truck of the invention in step 13 of the invention process.

FIG. 15A is the side view of the pivoting ram.

DETAILED DESCRIPTION OF THE PREFERRED EMBODIMENT

Figure 4:
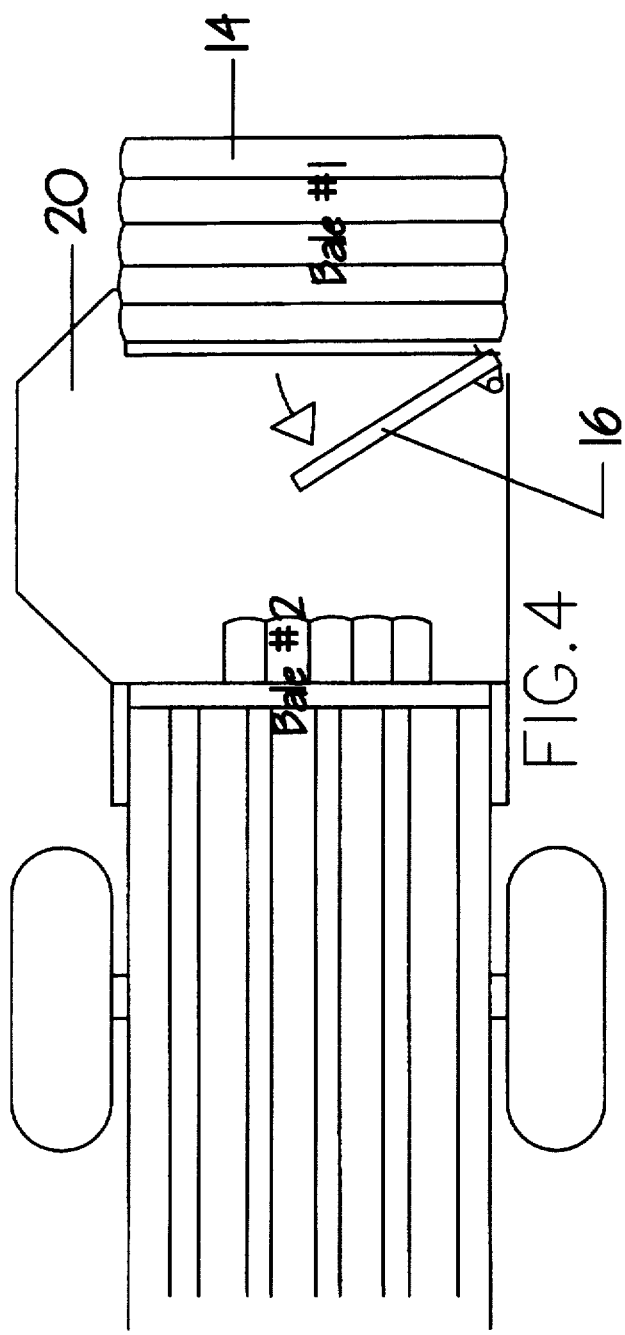
FIG. 4 is the top view of the baler and the cart of the invention at step 4 in the invention process.

This invention is a process for picking up bales of hay, straw, or other agricultural materials. The invention comprises two pieces of machinery. The first shown in FIG. 1 is a cart 10 that attaches to the baler 12. Step 1, shown in FIG. 1 and 1A, the cart 10 attaches to the baler 12 in the rear at the position where the bales 14 are discharged from the baler 12. The cart 10 has a single axle and dual wheels and is attached to the baler 12 at the point where the baler 12 discharges the bales 14. As shown in FIG. 2 and 2A step 2, the bales 14 are discharged from the baler 12 and are deposited on the cart bed 20. Said cart bed 20 is flat for holding the bales 14. On the cart bed 20 is an arm 16 that is attached to the cart 10 by a vertical axle 18. This arm 16 can be rotated ninety degrees in a horizontal plane. The arm 16 is located on cart bed 20 next to and parallel to the side of the bale 14. In the preferred embodiment, the vertical axle 18 is located in the corner of the bed furthermost away from baler. Once the bale 14 is deposited on the cart bed 20 by the baler 12, the arm 16 begins to rotate in a horizontal plane as shown in step 3 FIG. 3 and 3A.

Figure 4A:
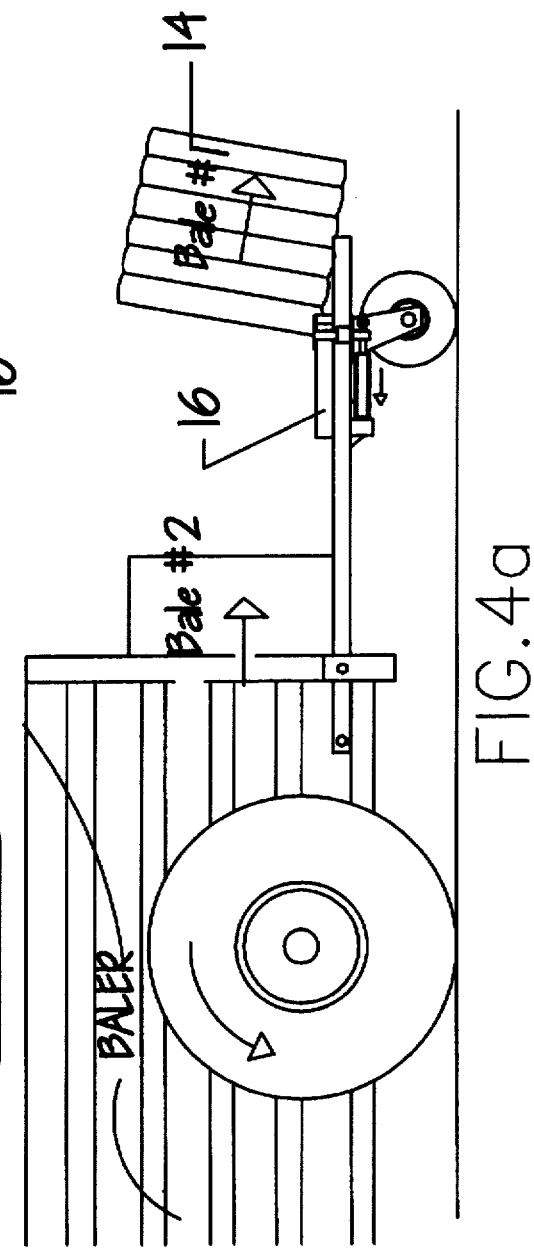
FIG. 4A is the side view of the baler and the cart of the invention at step 4 in the invention process.
Figure 5:
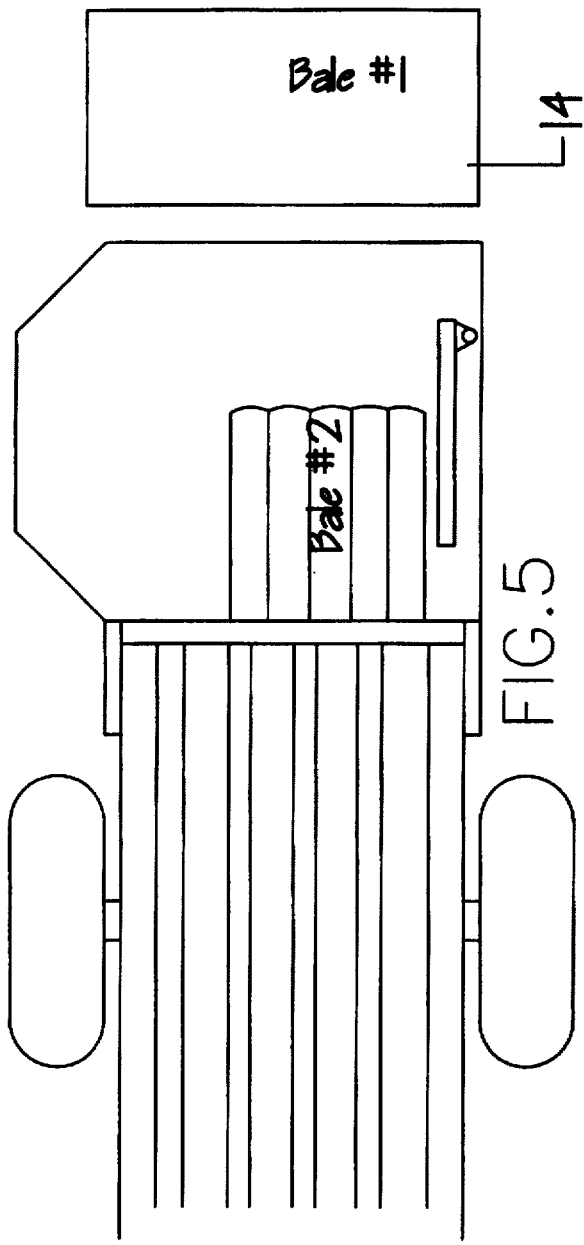
FIG. 5 is a top view of the baler and the cart of the invention at step 5 in the invention process.
Figure 5A:
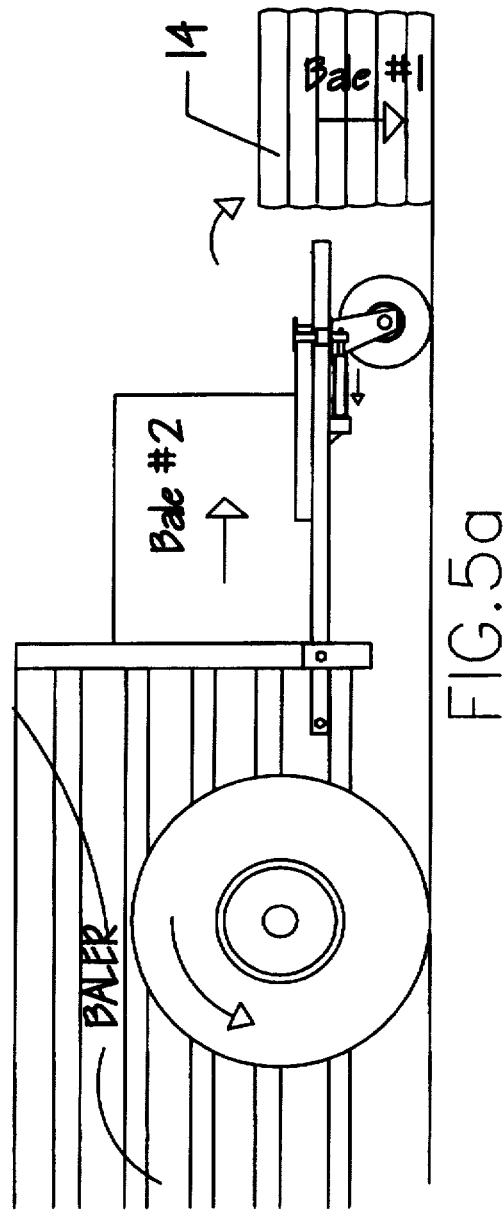
FIG. 5A is a side view of the baler and the cart of the invention at step 5 in the invention process.

The arm 16 fully rotates ninety degrees, pushing the bale 14 and causing the bale 14 to also rotate ninety degrees. As shown in step 4 FIG. 4 and 4A, the arm 16 is located such that when the bale 14 is rotated ninety degrees, the bale 14 will fall from the cart bed 20 to the field. In step 5 FIG. 5 and 5A, the bale 14 is now located in the field and has been rotated ninety degrees so the bale wagon 22 in FIG. 6 can easily pick up the bale 14 of straw, hay, or other agricultural material.

Figure 6:
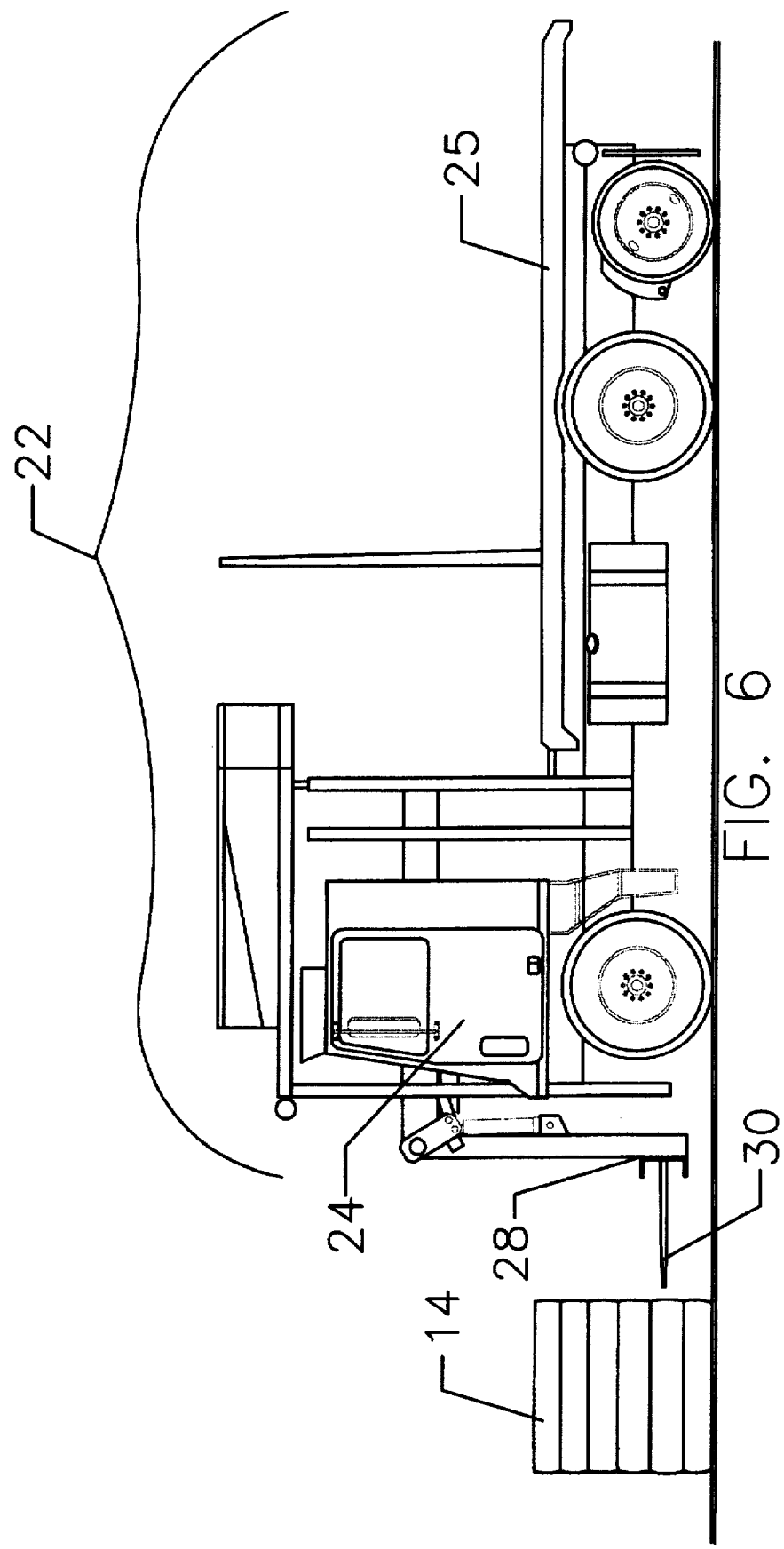
FIG. 6 is a side view of the truck of the invention.

A side view of bale wagon 22 is shown in FIG. 6. The bale wagon 22 has a cab 24 and an engine which drives the bale wagon 22 and makes it self propelled. The bale wagon 22 has a flat bed 25 in back and a boom 28 in front. Said boom 28 in the preferred embodiment is hydraulic and rotates one hundred eighty degrees. The boom 28 includes a plurality of tines 30 designed to penetrate the bale 14 as it rests in the field. The bale wagon 22 drives forward and the tines 30 penetrate the bale 14 as shown in FIG. 7 step 6. The tines 30 penetrate the bale 14 sufficiently enough that the bale 14 can easily be picked up by the boom 28. The boom 28 then pivots one hundred eighty degrees. The one hundred eighty degree pivoting of the boom 28 is accomplished with a pair of hydraulic cylinders 32 and 34 shown in FIG. 7, 7A, 7B and 7C in the preferred embodiment. The first cylinder 32 is secured between the bale wagon frame 36 and a plate 38 that is rotatably mounted to a pin 40 which the boom 28 pivots about. The second cylinder 34 is rotatably attached to the boom 28 at one end and attached to the plate 38 at the other.

Figure 10:
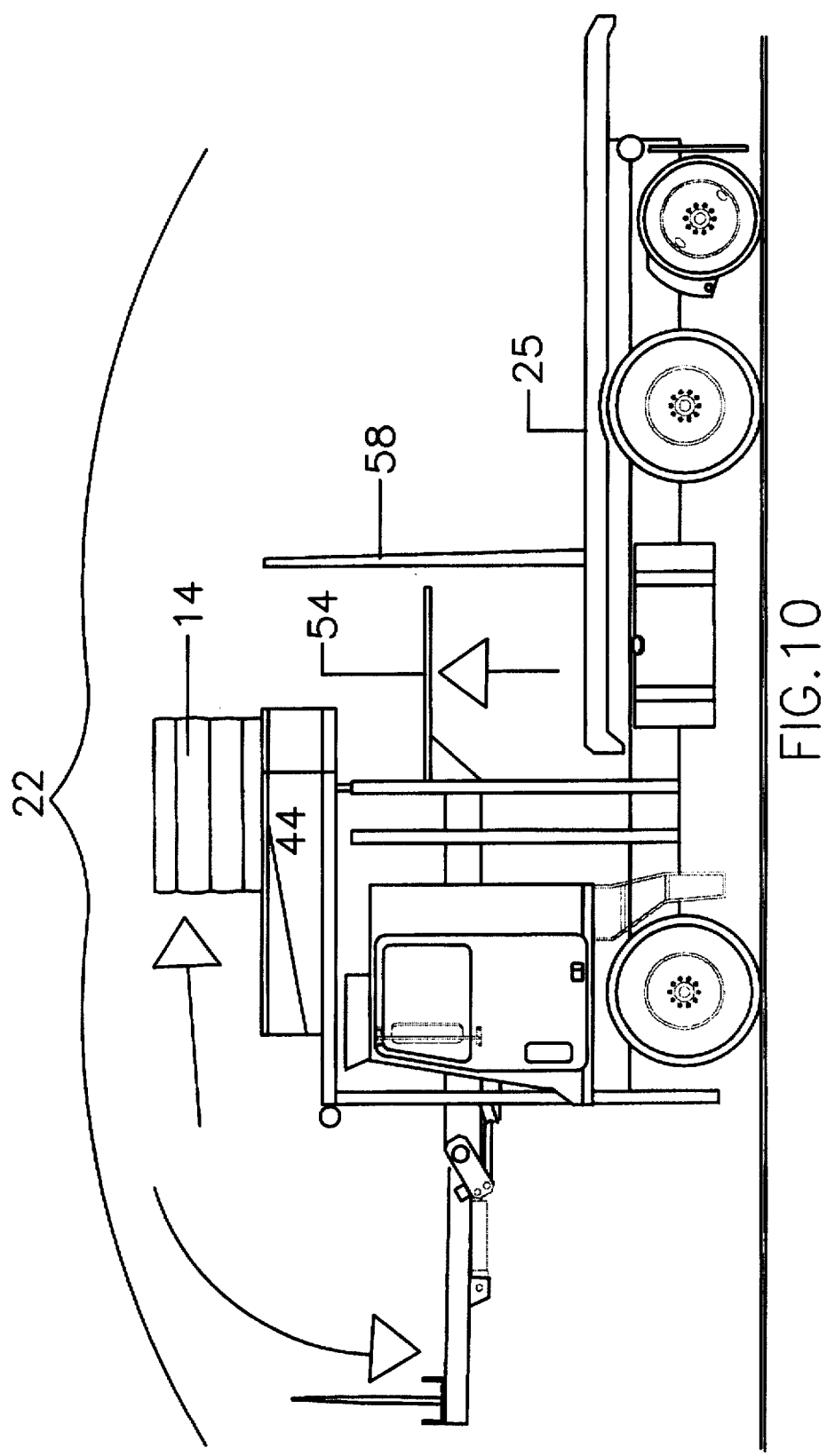
FIG. 10 is a side view of the truck of the invention in step 9 of the invention process.

Cylinders 32 and 34 are actuated in sequence, with the primary cylinder being actuated first to pivot the boom 28 ninety degrees as shown in FIG. 7A and 7B step 7. Then the second cylinder 34 is actuated, pivoting the boom an additional ninety degrees as shown in FIG. 7C and 8 step 8. This causes the boom 28 to rotate a full one hundred eighty degrees. The pivoting of the boom 28 lifts the bale 14 up to a conveyor table 44 above the cab 24 as shown in FIG. 8. This conveyor table 44 has in the preferred embodiment two chains 48 on the conveyor table floor 50 that propel the bale 14 toward the rear of the bale wagon 22 as shown in FIG. 8. FIG. 8A, the top view, the conveyor table 44 has two sides 52 that raise approximately 12 inches above the conveyor table floor 50. These two sides 52 form a path that gets narrower as the bale 14 moves rearwardly. These sides 52 are used to direct the bale 14 into the proper position for loading on the moveable forks 54. The bale 14 is placed upon the conveyor table 44 and moved rearwardly by a bar 46 which is attached to the chains 48 by pulling the bale 14 off the tines 30 as shown in FIG. 9. When the bale 14 is off the tines 30, the boom 28 is lowered. The chains 48 continue to move the bale 14 rearwardly until the bale 14 gets to the back of the conveyor table 44 and falls onto the moveable forks 54 and is held in place by the vertical tines 58 of the tailgate 58 as shown in FIG. 10.

Figure 11:
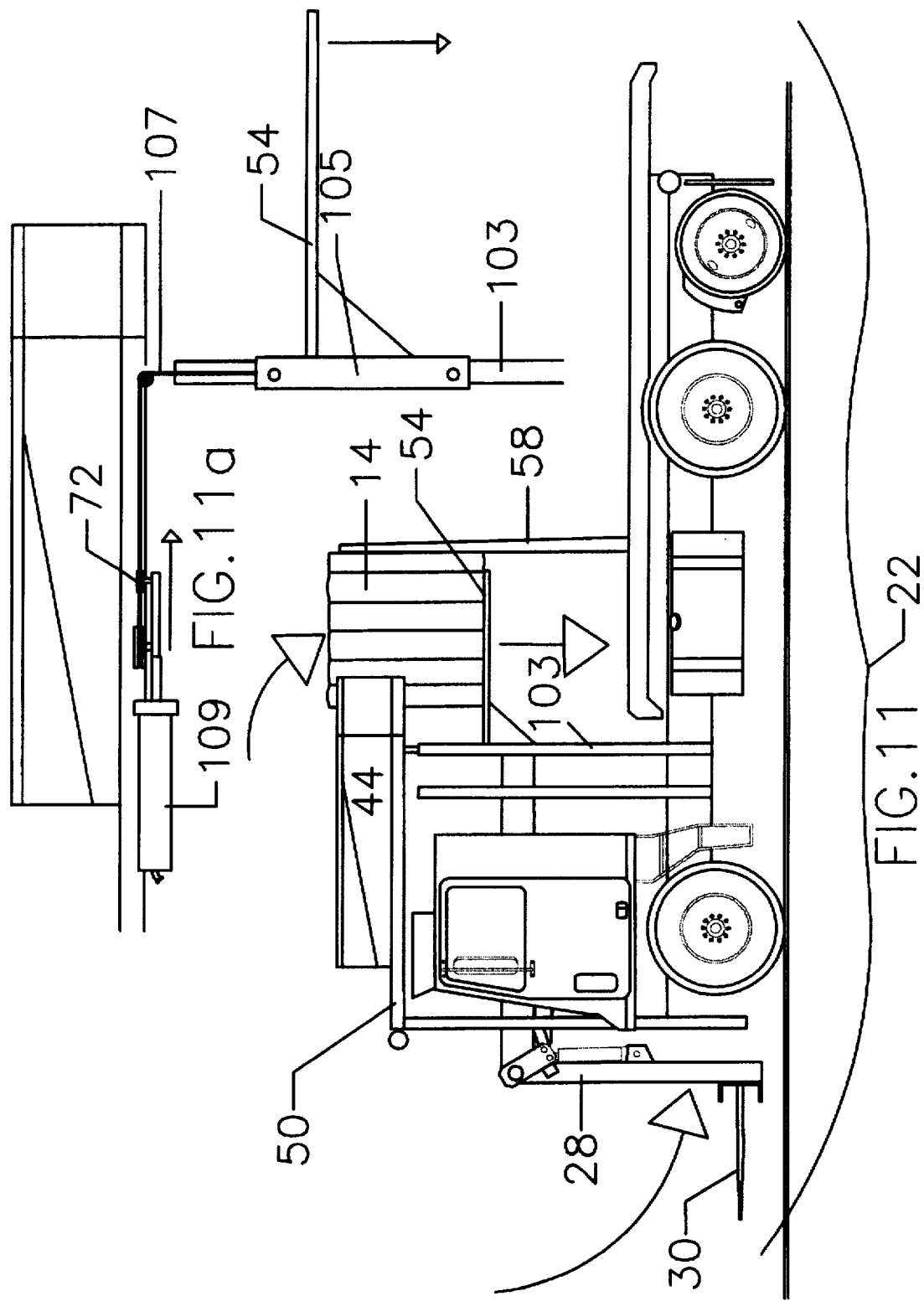
FIG. 11 is a side view of the truck of the invention in step 10 of the invention process.

The moveable forks 54 then lower the bale 14 down to the flat bed 25 of the bale wagon 22. The moveable forks 54 are raised and lowered by a hydraulic cylinder and a set of pulleys in the preferred embodiment as shown in FIG. 11A. There are many methods in art for raising and lowering the forks 54 as used in the bale wagon 22. FIG. 11A shows the moveable forks 54 that are attached to a vertical tube 105. The vertical tube 105 runs in a pair of tracks 103 that are attached to the frame of the bale wagon 22. A cable 107 is attached to the tube 105. The cable is attached to a hydraulic cylinder 109 after threading its way through a set of pulleys. The hydraulic cylinder 109 moves in and out causing the cable 107 to move. The force on the cable 107 is transferred by the set of pulleys 72 and the moveable forks 54 to move it up and down along the vertical track 103. The bale 14 is held in place by a tailgate 58 as shown in FIG. 11 step 10. The tailgate 58 consists of two vertical tines 58 that hold the bales 14 in place.

Figure 12:
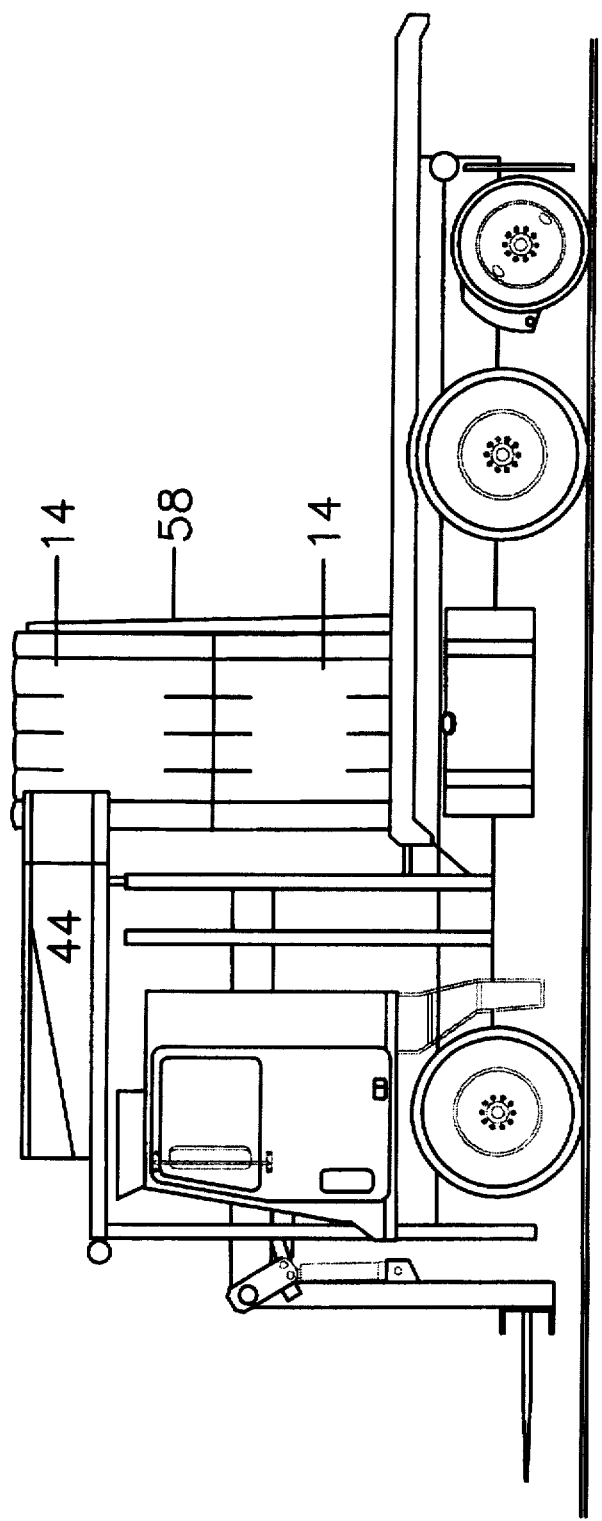
FIG. 12 is a side view of the truck of the invention in step 11 of the invention process.

The bale wagon 22 then moves forward and stabs a second bale 14 with its tines 30. The boom 28 again is rotated one hundred eighty degrees and the bale 14 is placed on the conveyor table 44. The bar 46 on the conveyor table floor 50 moves the bales 14 toward the rear, removing the bale 14 from the tines 30 and the boom 28 is returned to its original position. The bale 14 is then moved to the rear and off the conveyor table 44 by the bar 46 and falls upon the first bale 14 as shown in FIG. 12 step 11. The second bale 14 is also held in place by the vertical tines 58 of the tailgate Then a horizontal ram 62 with a vertical plate 64 is moved rearwardly towards the bales 14. The ram's vertical plate 64 is of sufficient size so that it makes contact with both the first and second bales 14 and it pushes said bales 14 with the tailgate 58 rearwardly, making room for another set of two bales 14 as shown in FIG. 13 step 12. The horizontal ram 62 is driven by a hydraulic cylinder 121 as shown in FIG. 13A. The tailgate 58 moves rearward to make room for more bales 14 to be placed on the bed 25 of the bale wagon 22. This is accomplished by the tailgate 58 being attached to a hydraulic cylinder 131 by way of cable 133 and a set of pulleys 135 as shown in FIG. 14 and 14A. The tailgate's hydraulic cylinder 131 works in sequence with the horizontal ram 62 which pushes the bale 14 rearward as shown in FIG. 13. When the horizontal ram 62 pushes the bales 14 rearward, the tailgate's hydraulic cylinder 131 pulls on the cable 133 whose force is transferred by a set of pulleys 135 to allow the tailgate 58 to move rearward. Once the bales 14 are in proper position, the hydraulic cylinder 131 locks and does not allow the tailgate to move again.

The bale wagon 22 moves on, picking up another bale 14 and placing it on the flat bed 25 the same as was described for the first bale 14 above. The bales 14 are stacked two bales high and four bales long on the flat bed 25. Then the bale wagon 22 moves to the remote location for unloading the bales 14. Under the flat bed 25 is a set of hydraulic cylinders 140 that pivot the flat bed 25 of the bale wagon ninety degrees as shown in FIG. 15 step 13. This causes the bales to also be pivoted ninety degrees and the bales are held on by the tailgate 58.

FIGS. 15 & 15A show a pivoting arm 66 attached to the flatbed 25 at one end and at the other end an axle 67 with a set of dual wheels 68. The dual wheel 68 is made up of two wheels with tires. FIG. 15A shows a hydraulic cylinder 69 which is attached to the flatbed 25 at one end and the pivoting arm 66 at the other end in such a way that when the hydraulic cylinder 69 moves outward forcing the pivoting arm 66 outward perpendicular to the flatbed 25 to cause the dual wheels 68 to move outward pushing the bales 14 of agricultural material off the tailgate 58. When the bales 14 are off the tailgate 58, the flatbed 25 is lowered and the bale wagon 22 then drives away to pick up more bales 14.

Changes and modification in this specifically described embodiment can be carried out without deviating from the scope of the invention that is intended to be limited only by the scope of claims.

I claim:

1. A bale handling system comprising:
   a. a truck with a flat bed and a cab;
   b. tines that will penetrate a bale and are of a sufficient length that they would, if moved upward, be able to pick up said bale;
   c. a table above the cab of the truck attached to the truck;
   d. a means for picking up the bale from the field by the tines which are attached to one end of the means for picking up the bale, and placing the bale on the table above the cab and the second end of the means for picking up the bale is attached to the truck;
   e. a set of forks that move from the flat bed of the truck to the table above the cab and down again attached to the flat bed of the truck;
   f. a means for taking the bale off the tines and moving the bales on the table and placing the bales on the set of forks attached to the truck;
   g. a means for raising and lowering the set of forks attached to the set of forks and the truck;
   h. a means for moving the bales from the set of forks to the flat bed and moving the bales along the flat bed attached to the truck;
   i. a means for holding the bales on the flat bed attached to the flat bed;
   j. a means for unloading said bales from the flat bed at a remote location attached to said truck;
   k. a means for rotating the bales as the bale is discharged from a baler 90 degrees and discharging the bale in a field in which the baler is operating and said means for rotating is attached to the baler.

2. A bale handling system as in claim 1 wherein:
   a. the means for rotating the bale comprises:
      (1) a table and said table is attached to the baler in such a way that when the baler discharges a bale, said bale will be discharged onto the table and said table has a set of wheels such that it is able to roll along the ground; and,
      (2) a means for rotating the bale ninety degrees and pushing said bale from the table and onto the field.

3. A bale wagon as in claim 2 wherein:
   a. said means for rotating the bale on the table and for pushing the same bale onto the field comprises:
      (1) a bar;
      (2) an axle attached to the table and attached to the bar such as that the bar can rotate on the same plane as the table;
      (3) whereby when the bale from the baler is discharged to the table, the bar is parallel to the side of the bale and when the bar rotates ninety degrees, it rotates the bale ninety degrees and pushes the bale from the table onto the field.

4. A bale handling system comprising:
   a. a truck with a flat bed and a cab;
   b. tines that will penetrate the bales and are of a sufficient length that they would, if moved upward, be able to pick up said bale;
   c. a table above the cab of the truck attached to the truck;
   d. a means for picking up the bale from the field by the tines which are attached to one end of the means for picking up the bails, and placing the bale on the table above the cab and second end of the means for picking up the bale is attached to the truck;
   e. a set of forks that move from the flat bed of the truck to the table above the cab and down again attached to the flat bed of the truck;
   f. a means for taking the bale off the tines and moving the bales on the table and placing the bales on the set of forks attached to the truck;
   g. a means for raising and lowering the set of forks attached to the set of forks and the truck;
   h. a means for moving the bales from the set of forks to the flat bed and moving the bales along the flat bed attached to the truck;
   i. a means for holding the bales on the flat bed attached to the flat bed;
   j. a means for unloading said bales from the flat bed at a remote location attached to said truck.

5. A bale wagon as in claim 4 wherein:
   a. the means for picking up the bale from the field by the tines and placing it on the table is a boom attached to the cab and said boom has a bottom and on said boom bottom the tines are attached and said boom is adapted to rotate one hundred eighty degrees;
   b. whereby as the truck moves through a field to pick up the bale, the truck maneuvers so that the tines penetrate into the bale and then the boom is rotated one hundred eighty degrees, lifting the bale to the table above the cab.

6. A bale wagon as in claim 5 wherein:
   a. the boom is pivoted one hundred eighty degrees by a hydraulic system.

7. A bale wagon as in claim 4 wherein:
   a. the means for taking the bale off the tines and moving the bale on the table and placing it on the forks comprises of:
      (1) a moveable chain that moves along the floor of the table;
      (2) a bar attached to the chains;
      (3) whereby the chains move and the bar comes into contact with the bale placed upon the table by the means for picking up the bale and the bar pulls the bale off the tines, pushes the bale to the back of the table, and pushes the bale off the table and onto the moveable forks.

8. A bale wagon as in claim 4 wherein:
   a. the means for raising and lowering the forks comprises:
      (1) a hydraulic cylinder;
      (2) a set of pulleys;
      (3) a cable attached to the hydraulic cylinder and the moveable forks such that when the hydraulic cylinder moves in and out the moveable forks move up and down.

9. A bale wagon as in claim 4 wherein:
   a. the means for moving the bales from the forks to the flat bed and moving the bales of hay along the flat bed comprises:

(1) a hydraulic cylinder attached to the back of the cab in a position parallel to the flat bed;

(2) a plate attached to the end of the hydraulic cylinder of sufficient size that it can make contact with two bales of hay placed on top of each other on the flat bed;

(3) whereas when the hydraulic cylinder moves towards the back of the flat bed the vertical plate can push two bales of hay towards the back of the flat bed.

10. A bale wagon as in claim 4 wherein;

a. the means for unloading said bale from the flatbed at a remote location comprises:
(1) a means for raising the flat bed to vertical
(2) a means for pushing the bales off the flat bed
(3) whereby when the flat bed is moved to vertical the bales are pushed from the flat bed and off the means for holding the bales on the flat bed.

11. A bale wagon as in claim 10 wherein:

a. the means for pushing the bales off the flat bed is a pivoting arm that is attached and embedded in the flat bed and when the bales are to be pushed off the truck and the flat bed has been moved to ninety degrees, the pivoting arm moves outward pushing the bales off the means for holding the bales on the flat bed.

12. A bale wagon as in claim 4 wherein:

a. the means for holding the bales on the flat bed is a moveable tailgate.

13. A bale wagon as in claim 12 wherein:

a. the moveable tailgate comprises:
(1) moveable tines that are set vertical to the flat bed;
(2) a hydraulic cylinder;
(3) a set of pulleys;
(4) a cable attached to the set of tines and the hydraulic cylinder that threads through the pulleys;
(5) wherein, when the hydraulic cylinder moves, it pulls the cable either in or out and the cable is threaded through the pulleys and this pulling of the cable moves the tines either rearwardly or forward along the flat bed.

* * * * *